United States Patent [19]
Lowe et al.

[11] Patent Number: 4,900,528
[45] Date of Patent: Feb. 13, 1990

[54] ZEOLITE SYNTHESIS

[75] Inventors: Barrie M. Lowe; Abraham Araya, both Edinburgh, Scotland

[73] Assignee: Imperial Chemical Industries PLC, London, England

[21] Appl. No.: 434,228

[22] Filed: Oct. 14, 1982

[30] Foreign Application Priority Data

Oct. 21, 1981 [GB] United Kingdom ................. 8131767

[51] Int. Cl.$^4$ ............................................. C01B 33/28
[52] U.S. Cl. .................................................. 423/328
[58] Field of Search ........................ 423/328, 329, 332; 502/77

[56] References Cited

U.S. PATENT DOCUMENTS

| 4,108,881 | 8/1978 | Rollmann et al. | 423/329 |
| 4,139,600 | 2/1979 | Rollmann et al. | 423/329 |
| 4,285,922 | 8/1981 | Audeh et al. | 423/329 |
| 4,358,397 | 11/1982 | Chu | 423/328 |
| 4,423,021 | 12/1983 | Rollmann et al. | 423/332 |
| 4,481,177 | 11/1977 | Valyocsik | 423/329 |

FOREIGN PATENT DOCUMENTS

| 1553209 | 9/1979 | United Kingdom | 423/328 |
| 2071632 | 9/1981 | United Kingdom | 423/329 |

OTHER PUBLICATIONS

Barrer, R. M. et al., "Hydrothermal Chemistry of Silicates, Part IV Rubidinium and Caesium Aluminosilicates", *J. Chem. Soc.*, pp. 4029–4034 (1953).

Primary Examiner—John Doll
Assistant Examiner—R. Bruce Breneman
Attorney, Agent, or Firm—Cushman, Darby & Cushman

[57] ABSTRACT

Zeolite Nu-10 is prepared from a reaction mixture containing at least one oxide $XO_2$ (where X is preferably silicon), at least one oxide $Y_2O_3$ (where Y is preferably aluminium), and, optionally at least one organic compound selected from (i) compounds of formula $L^1$—$(CH_2)_n$—$L^2$ where $L^1$ and $L^2$ independently represent a hydroxyl group or an optionally substituted amino group and n is an integer from 2 to 20, provided that when both $L^1$ and $L^2$ are optionally substituted amino groups, n is an integer from 6 to 20 and (ii) heterocyclic bases. Preferred organic compounds are diamines, diols and heterocyclic di- or mono-amines. The reaction mixture also includes an alkali metal hydroxide, sodium, potassium and rubidium being particularly suitable.

Zeolite Nu-10 is useful as a catalyst for various hydrocarbon conversion reactions, for the conversion of small oxygen-containing organic molecules to hydrocarbons and as an agent for the removal of organic compounds from aqueous effluents.

4 Claims, No Drawings

ZEOLITE SYNTHESIS

The present invention relates to a zeolite synthesis and particularly to a new method for the preparation of zeolite Nu-10.

In our European Patent Application No. 82302366.8 there is described zeolite Nu-10 having a molar composition expressed by the formula:

0.5 to 1.5$R_2O$:$Y_2O_3$: at least 20 $XO_2$:0 to 4000$H_2O$ wherein R is a monovalent cation or 1/n of a cation of valency n, X is silicon and/or germanium, Y is one or more of aluminium, iron, chromium, vanadium, molybdenum, arsenic, antimony, manganese, gallium or boron, and $H_2O$ is water of hydration additional to water notionally present when R is H, and having an X-ray pattern substantially as set out in Table 1 (as determined by standard technique using copper K α radiation). This definition includes both freshly prepared Nu-10 ("freshly prepared" means the product of synthesis, and washing, with optional drying, as hereinafter described) and also forms of it resulting from dehydration, and/or calcination, and/or ion exchange. In freshly prepared Nu-10, R may include an alkali metal cation,

TABLE 1

X-Ray Data of zeolite Nu-10

| d(A) | I/Io |
|---|---|
| 10.95 ± 0.25 | m→s |
| 8.80 ± 0.14 | w→m |
| 6.99 ± 0.14 | w→m |
| 5.41 ± 0.10 | w |
| 4.57 ± 0.09 | w |
| 4.38 ± 0.08 | vs |
| 3.69 ± 0.07 | vs |
| 3.63 ± 0.07 | vs |
| 3.48 ± 0.06 | m→s |
| 3.36 ± 0.06 | w |
| 3.31 ± 0.05 | w |
| 2.78 ± 0.05 | w |
| 2.53 ± 0.04 | m |
| 2.44 ± 0.04 | w |
| 2.37 ± 0.03 | w |
| 1.88 ± 0.02 | w |

In the table, the relative intensities, I/$I_o$, are given in terms of the symbols:
- w=weak (I/$I_o$ in the range 0 to 20)
- m=medium (I/$I_o$ in the range 20 to 40)
- s=strong (I/Ihd o in the range 40 to 60)
- vs=very strong (I/$I_o$ in the range 60 to 100)

especially sodium, potassium, rubidium or caesium. Ammonium and hydrogen may also be present. Usually, or when prepared from nitrogen compounds, zeolite Nu-10 includes nitrogen-containing organic cations or bases as described below or cationic degradation products thereof, or precursors thereof. These nitrogen containing cations or bases are hereinafter referred to as Q.

The freshly prepared Nu-10 may also contain nitrogen-containing compounds well in excess of the 1.5 moles set out in the aforesaid definition of the composition of Nu-10 typically in the range 0.1 to 120 moles per mole of $Y_2O_3$. Since Nu-10 is a zeolite, the nitrogen containing base must be physically trapped within the crystal lattice. It can be removed by thermal treatment and/or oxidative degradation or by displacement by suitable small molecules. This physically trapped basic material does not constitute part of the composition for the purposes of the definition. Thus Nu-10 as made typically has the following molar composition:

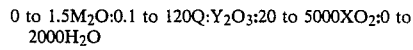

0 to 1.5$M_2O$:0.1 to 120Q:$Y_2O_3$:20 to 5000$XO_2$:0 to 2000$H_2O$ wherein M is an alkali metal and/or ammonium and can include hydrogen.

The aforementioned patent application also describes a method of preparing zeolite Nu-10 which comprises reacting an aqueous mixture containing specified proportions of at least one oxide $XO_2$, at least one oxide $Y_2O_3$ and at least one polyalkylene polyamine having the formula:

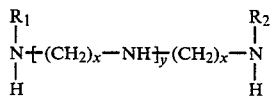

wherein each of $R_1$ and $R_2$, independently, represents hydrogen or a $C_1$ to $C_6$ alkyl group, x is in the range 2 to 6 and y is in the range 0 to 10 provided that when y is 0, x is in the range 2 to 5, or a degradation product or a precursor of said polyamine. Preferred polyamines include triethylene tetramine and tetraethylene pentamine.

It has now been found that zeolite Nu-10 may be prepared from a reaction mixture in which the aforesaid polyamine is omitted and optionally replaced by an organic compound as hereinafter defined.

Thus, according to the present invention, there is provided a method for the preparation of zeolite Nu-10 which comprises reacting an aqueous mixture containing sources of at least one oxide $XO_2$, at least one oxide $Y_2O_3$ and optionally, at least one organic compound selected from:

(a) compounds of the formula:

$L^1$—$(CH_2)_n$—$L^2$ wherein each of $L^1$ and $L^2$, independently, represents a hydroxyl or an optionally substituted amino group and n is an integer from 2 to 20, provided that when both $L^1$ and $L^2$ are optionally substituted amino groups n is an integer from 6 to 20, and (b) heterocyclic bases,
the reaction mixture having the molar composition:
$XO_2/Y_2O_3$= 10 to 10000, preferably 30 to 1500, more preferably 50 to 600
$M^1OH/XO_2$=$10^{-8}$ to 1.0, preferably $10^{-6}$ to 0.25
$H_2O/XO_2$=10 to 200, preferably 15 to 60
Q/$XO_2$=0 to 4, preferably 0.1 to 1.0
$M^2Z/XO_2$=0 to 4.0, preferably 0 to 1.0
wherein each of $M^1$ and $M^2$ represent an alkali metal, ammonium or hydrogen, Q represents the organic compound, X and Y have the meanings given above and Z represents an acid radical.

As the formula shows, the organic compound (a) may be a diamine, an amino-alcohol or a diol or any mixture thereof, for example a mixture of a diamine and a diol. Suitable diamines include compounds of the formula:

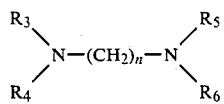

wherein each of $R_3$ to $R_6$, independently, represents hydrogen or a $C_1$ to $C_6$ alkyl group and n has the meaning given above. A particularly useful diamine is hexamethylene diamine. Suitable diols include 1,6-hexanediol.

The organic compound (b) is preferably a 5- or 6-membered saturated heterocyclic diamine such as piperazine or triethylene diamine or a mono-amine such as pyrrolidone, piperidine or morpholine.

Mixtures of compounds of types (a) and (b) may be used, for example a mixture of hexamethylene diamine and piperazine.

Particularly suitable alkali metals for use in the method of the invention include sodium, potassium, rubidium and caesium, and mixtures of two or more of these, especially (a) rubidium and sodium, and (b) rubidium and potassium.

The preferred oxide $XO_2$ is silica ($SiO_2$) and the preferred oxide $Y_2O_3$ is alumina ($Al_2O_3$).

The silica source can be any of those commonly considered for use in synthesising zeolites, for example powdered silica, silicic acid, colloidal silica or dissolved silica. Among the powdered silicas usable are precipitated silica, especially those made by precipitation from an alkali metal silicate solution, such as the type known as "KS 300" made by AKZO, and similar products, aerosil silicas, fume silicas such as "CAB-O-SIL" M5 and silica gels suitably in grades for use in reinforcing pigments for rubber or silicone rubber. Colloidal silicas of various particle sizes may be used, for example 10 to 15 or 40 to 50 microns, as sold under the Registered Trade Marks "LUDOX", "NALCOAG" and "SYTON". The usable dissolved silicas include commercially available waterglass silicates containing 0.5 to 6.0, especially 2.0 to 4.0 mols of $SiO_2$ per mol of alkali metal oxide, "active" alkali metal silicates as defined in UK Pat. No. 1193254 and silicates made by dissolving silica in alkali metal hydroxide or quaternary ammonium hydroxide or a mixture thereof.

The alumina source is most conveniently a soluble aluminate, but aluminium, and aluminium salts, for example the chloride, nitrate or sulphate, an aluminium alkoxide or alumina itself, which should preferably be in a hydrated or hydratable form such as colloidal alumina, pseudoboehmite, boehmite, gamma alumina or the alpha or beta trihydrate.

The reaction mixture is usually reacted under autogeneous pressure, optionally with added gas, e.g. nitrogen, at a temperature between 85° and 250° C. until crystals of zeolite Nu-10 form, which can be from 1 hour to many months depending on the reactant composition and the operating temperature. Preferred reaction temperatures lie in the range 130° to 220° C. Agitation is optional, but is preferable since it assists homogenisation of the reaction mixture and reduces the reaction time. Seeding of the reaction mixture with Nu-10 can also be advantageous.

At the end of the reaction, the solid phase is collected on a filter and washed and is then ready for further steps such as drying, calcination and ion-exchange.

If the product of the reaction contains alkali metal ions, these have to be at least partly removed in order to prepare the catalytically active hydrogen form of Nu-10 and this can be done by ion exchange with an acid, especially a strong mineral acid such as hydrochoric acid or by way of the ammonium compound, made by ion exchange with a solution of an ammonium salt such as ammonium chloride. Ion exchange can be carried out by slurrying once or several times with the ion-exchange solution. The zeolite is usually calcined before ion exchange but this may be effected after ion-exchange or during ion-exchange if the latter is carried out in a number of stages.

Zeolite Nu-10 prepared by the method of the invention is useful as a catalyst, for example as a hydrocarbon conversion catalyst and in the conversion of small oxygen-containing organic molecules to hydrocarbons. Other uses for zeolite Nu-10 are set out in our co-pending European patent application No. 82302366.8. It may be employed using the general techniques described in the prior art for zeolite catalyts.

The invention is illustrated but not limited by the following Examples.

EXAMPLE 1

A synthesis mixture having the molar composition $$5 Rb_2O, 1.00 Al_2O_3, 60 SiO_2, 3000 H_2O, 10 HMD.$$

(HMD = hexamethylene diamine = hexane-1,6-diamine)

was prepared as follows. An aluminate solution was made by dissolving 1.04 g of alumina trihydrate in a solution of 8.03 g of rubidium hydroxide monohydrate dissolved in 10.0 g of distilled water in a beaker using a hotplate magnetic stirrer. The aluminate solution was then added to a mixture of 24.0 g CAB-O-SIL M5 silica, 15.5 g of hexane-1,6-diamine and 300 g of water. An additional 48 g of water was used to rinse the aluminate solution from the beaker and added to the reaction mixture. The mixture was then stirred until it appeared to be homogeneous.

The mixture was then placed in a stainless steel autoclave in which it was stirred at 300 revolutions per minute, and allowed to react at 180° C. Crystallisation was complete in 49 hours.

The zeolite was then filtered from the reaction mixture, washed with distilled water and dried at 120° C.

EXAMPLES 2–5

Using the procedure described in Example 1 and a reaction mixture having the molar composition:

$$5M_2O, 0.35Al_2O_3, 60SiO_2, 20HMD, 3000H_2O$$

samples of zeolite Nu-10 were made using, in turn, sodium, potassium, rubidium and caesium as the alkali metal.

The X-ray diffraction data of the products are given in Table 2.

The potassium HMD Nu-10 was calcined for 72 hours in air at 550° C. and then equilibrated with water vapour over saturated aqueous sodium chloride solution for 8 days. The X-ray diffraction pattern of the calcined product is shown in Table 3.

EXAMPLES 6–8

Further samples of potassium HMD Nu-10 were made using the reaction mixtures and reaction conditions given in Table 4.

TABLE 2

X-Ray data for as synthesised Nu-10

| Example 2 Na - Nu-10 | | Example 3 K - Nu-10 | | Example 4 Rb - Nu-10 | | Example 5 Cs - Nu-10 | |
|---|---|---|---|---|---|---|---|
| d/A | I/Io | d/A | I/Io | d/A | I/Io | d/A | I/Io |
| 11.0 | 46 | 10.8 | 52 | 10.9 | 49 | 11.0 | 49 |
| 8.78 | 10 | 8.68 | 11 | 8.74 | 7 | 8.79 | 9 |
| 6.99 | 15 | 6.93 | 16 | 6.99 | 14 | 6.99 | 14 |
| 5.43 | 10 | 5.41 | 10 | 5.42 | 9 | 5.42 | 10 |
| 4.58 | 14 | 4.58 | 12 | 4.58 | 13 | 4.59 | 12 |
| 4.38 | 100 | 4.36 | 100 | 4.37 | 100 | 4.38 | 100 |
| 3.86 | 2 | — | — | — | — | — | — |
| 3.68 | 87 | 3.67 | 86 | 3.68 | 86 | 3.68 | 88 |
| 3.63 | 70 | 3.62 | 69 | 3.62 | 72 | 3.64 | 74 |
| 3.48 | 39 | 3.47 | 41 | 3.48 | 39 | 3.48 | 47 |
| 3.38 | 6 | 3.37 | 7 | 3.38 | 7 | 3.40 | 11 |
| 3.35 | 10 | 3.34 | 9 | 3.34 | 8 | 3.35 | 12 |
| 3.31 | 8 | 3.29 | 7 | 3.30 | 7 | 3.31 | 9 |
| 3.24 | 1 | 3.22 | 2 | 3.24 | 1 | — | — |
| 2.981 | 4 | 2.981 | 4 | 2.981 | 4 | 2.982 | 3 |
| 2.953 | 4 | 2.934 | 4 | 2.943 | 4 | 2.946 | 3 |
| 2.915 | 3 | 2.901 | 4 | 2.915 | 3 | 2.913 | 3 |
| 2.799 | 1 | 2.791 | 1 | 2.791 | 2 | — | — |
| 2.741 | 3 | 2.733 | 4 | — | — | 2.742 | 2 |
| 2.725 | 4 | 2.710 | 4 | 2.719 | 4 | 2.717 | 2 |
| 2.524 | 20 | 2.517 | 18 | 2.524 | 19 | 2.525 | 21 |
| 2.438 | 11 | 2.438 | 12 | 2.438 | 11 | 2.438 | 12 |
| 2.406 | 4 | 2.406 | 5 | 2.411 | 5 | 2.407 | 4 |
| 2.370 | 7 | 2.364 | 7 | 2.368 | 7 | 2.370 | 7 |
| 2.289 | 1 | 2.283 | 1 | 2.284 | 1 | — | — |

TABLE 3

X-Ray diffraction patterns of calcined K-HMD-Nu-10

| d/A | I/Io |
|---|---|
| 10.8 | 100 |
| 8.66 | 25 |
| 6.91 | 28 |
| 5.41 | 16 |
| 4.57 | 12 |
| 4.36 | 95 |
| 4.10 | 1 |
| 3.67 | 84 |
| 3.61 | 63 |
| 3.46 | 40 |
| 3.33 | 7 |
| 3.29 | 6 |
| 3.21 | 3 |
| 2.981 | 2 |
| 2.934 | 4 |
| 2.897 | 4 |
| 2.774 | 2 |
| 2.733 | 4 |
| 2.709 | 3 |
| 2.517 | 19 |
| 2.433 | 8 |
| 2.406 | 4 |

TABLE 4

Synthesis of Nu-10 under various conditions

| | Reaction mixture composition | | | | | |
|---|---|---|---|---|---|---|
| Example | $K_2O$ | $Al_2O_3$ | $SiO_2$ | $H_2O$ | HMD | T/°C. |
| 6 | 5 | 0.1 | 60 | 3000 | 20 | 180 |
| 7 | 5 | 1 | 60 | 3000 | 180 | |
| 8 | 5 | 0.35 | 60 | 3000 | 20 | 150 |

EXAMPLES 9–13

A synthesis mixture having the molar composition:

$5K_2O:0.35Al_2O_3:60SiO_2:3000\ H_2O:20C_nDM$ (where $C_nDM$ refers to a diamine having n carbon atoms) was prepared in a similar way to that described in Example 1 using various other diamines as well as hexa-methylenediamine (Example 9). Details of the preparations and the products obtained are shown in Table 5.

TABLE 5

| Example | Diamine Used ($\eta =$)* | Temperature (°C.) of reaction | Time (hours of reaction) | Products |
|---|---|---|---|---|
| 9 | 6 | 180 | 16.0 | Nu-10 |
| 10 | 8 | 180 | 18.0 | Nu-10 |
| 11 | 10 | 150 | 16.3 | Nu-10 + ZSM-5 |
| 12 | 10 | 180 | 11.5 | Nu-10 |
| 13 | 12 | 180 | 11.5 | Nu-10 + Cristobalite + Kenyaite + unidentified material |

*All of the diamines used were $\alpha,\omega$diamines $NH_2(CH_2)_nNH_2$

It would appear from these results that it is preferable to operate at a reaction temperature of 180° C. rather than 150° C. However, as can be seen from later Examples (see below) much depends on the cation present. Thus, even at 150° C. the $C_{12}$ diamine produces Nu-10 zeolite when part or all of the alkali metal cation is rubidium.

EXAMPLES 14 TO 19

A number of synthesis mixtures having the molar composition $xRb_2O:(5-x)K_2O:0.35Al_2O_3:60SiO_2:3000\ H_2O:20C_{12}DM$ (where $0 \leq x \leq 5$ and $C_{12}DM$ is $NH_2(CH_2)_{12}NH_2$) were prepared in a similar way to that described in Example 1. Details of the preparations and the products obtained are given in Table 6.

TABLE 6

| Example | $K_2O$ | $Rb_2O$ | Temp. (°C.) of reaction | Time (hours of reaction) | Products |
|---|---|---|---|---|---|
| 14 | 0.00 | 5.00 | 150 | 41 | Nu-10 |
| 15 | 1.25 | 3.75 | 150 | 47 | Nu-10 |
| 16 | 2.50 | 2.50 | 150 | 22 | Nu-10 + trace Cristobalite |
| 17 | 3.75 | 1.25 | 150 | 42 | Nu-10 + trace Cristobalite |
| 18 | 4.50 | 0.50 | 150 | 25 | Nu-10 + trace Kenyaite |
| | | | 150 | 65 | Nu-10 + trace Cristobalite |
| 19 | 4.90 | 0.10 | 150 | 42 | Nu-10 + trace Cristobalite |
| A | 5.00 | 0.00 | 150 | 17 | ZSM-5 |
| | | | 150 | 25 | ZSM-5 |

As can be seen, this reaction mixture at 150° C. produces ZSM-5 when x=0 and Nu-10 when x=5. Intermediate values of x do not lead to the formation of other zeolites and it is clear that the presence of very small amounts of rubidium (as low as 2% of the alkali metals present—see Example 19) is sufficient to prevent the formation of ZSM-5. We are not certain why rubidium is so effective in directing the reaction towards the formation of Nu-10 but it seems possible that rubidium is particularly effective in the formation of seed nuclei of Nu-10 and hence it reduces the induction period for Nu-10 formation and in this particular case reduces it below that for ZSM-5.

EXAMPLES 20 TO 32

A number of reaction mixtures designed to give Nu-10 under different conditions were prepared. Their composition and the products obtained are summarised in Table 7.

Introduction of a small amount of aluminium into an aluminium-free mixture causes Nu-10 to form even at 180° C. (see Examples 28 and 29). When rubidium is used instead of potassium (Example 30) there is a substantial increase in the proportion of Nu-10 in the products.

TABLE 7

| Example | Reaction Mixture Composition | | | | | Temp (°C.) of reaction | Time (hours) of reaction | Products |
| --- | --- | --- | --- | --- | --- | --- | --- | --- |
|  | Organic | M$_2$O | Al$_2$O$_3$ | SiO$_2$ | H$_2$O |  |  |  |
| 20 | 20C$_{12}$DM | None | 0.35 | 60 | 3000 | 180 | 208 | Amorphous |
|  |  |  |  |  |  |  | 243 | Amorphous |
|  |  |  |  |  |  |  | 243 | Added 4gKOH in 5ml H$_2$O |
|  |  |  |  |  |  |  | 258 | Nu-10 + ZSM-5 + Cristobalite |
| 21 | None | 4.9K$_2$O +0.1Rb$_2$O | 0.35 | 60 | 3000 | 150 | 87 | Amorphous + trace Kenyaite |
|  |  |  |  |  |  |  | 115 | Nu-10 + amorphous+Kenyaite |
|  |  |  |  |  |  |  | 136 | Nu-10 + amorphous + Kenyaite |
|  |  |  |  |  |  |  | 165 | Nu-10 + Nu-10 + Cristobalite |
| 22 | 20HEXDL | 4.9K$_2$O +0.1Rb$_2$O | 0.35 | 60 | 3000 | 150 | 73 | Nu-10 + amorphous |
|  |  |  |  |  |  |  | 114 | Nu-10 + Cristobalite |
| 23 | 20C$_6$DM | 5Na$_2$O +5RbBr | 0.35 | 60 | 3000 | 150 | 73 | Nu-10 |
| 24 | 10HEXDL +10C$_6$DM | 5K$_2$O | 0.35 | 60 | 3000 | 180 | 15 | Nu-10 + Cristobalite |
|  |  |  |  |  |  |  | 15 | Nu-10 + Cristobalite |
| 25 | 20C$_8$DM | 10Cs$_2$O | 1 | 60 | 3000 | 180 | 13 | Nu-10 + unidentified material |
|  |  |  |  |  |  |  | 66 | unidentified material + Cristobalite |
| 26 | 20C$_6$DM | 5K$_2$O | 0.0 | 60 | 3000 | 180 | 15.5 | ZSM-48 + kenyaite |
| 27 | 20C$_6$DM | 5K$_2$O | 0.0 | 60 | 3000 | 150 | 16.3 | Nu-10 precursor + Kenyaite |
|  |  |  |  |  |  |  | 20.0 | Nu-10 + ZSM-48 + amorphous |
|  |  |  |  |  |  |  | 40.0 | Nu-10 + ZSM-48 |
| 28 | 20C$_6$DM | 5K$_2$O | 0.1 | 60 | 3000. | 180 | 9.0 | Nu-10 precursor + amorphous |
|  |  |  |  |  |  |  | 11.0 | Nu-10 |
|  |  |  |  |  |  |  | 13.0 | Nu-10 + ZSM-48 |
|  |  |  |  |  |  |  | 14.0 | Nu-10 + Cristobalite |
| 29 | 20C$_6$DM | 5K$_2$O | 0.1 | 60 | 3000 | 150 | 30 | Nu-10 + ZSM-48 + amorphous |
|  |  |  |  |  |  |  | 46 | Nu-10 + ZSM-48 |
| 30 | 20C$_6$DM | 5Rb$_2$O | 0.1 | 60 | 3000 | 150 | 21.5 | Amorphous |
|  |  |  |  |  |  |  | 30.0 | Nu-10 precursor + amorphous |
|  |  |  |  |  |  |  | 45.5 | Nu-10 + ZSM-48 |
|  |  |  |  |  |  |  | 70.5 | Nu-10 + ZSM-48 |
|  |  |  |  |  |  |  | 97.5 | Nu-10 + ZSM-48 + Cristobalite |
| 31 | 20PIPZE | 5K$_2$O | 0.35 | 60 | 3000 | 180 | 22 | Nu-10 precursor + Kenyaite |
|  |  |  |  |  |  |  | 26 | Nu-10 + Cristobalite |
| 32 | 20C$_6$DM | 6.05Li$_2$O | 0.35* | 60 | 3000 | 180 | 22 | Nu-10 + ZSM-5 + Cristobalite |
|  |  |  |  |  |  |  | 48 | Nu-10 + ZSM-5 + Cristobalite |

*In Example 32 aluminium sulphate was used as the source of alumina and an extra 1.05 Li$_2$O was added to compensate for the 3 × 0.35 SO$_4^{2-}$
HEXDL is hexane-1,6-diol
PIPZE is piperazine The reaction mixture of Example 20 was identical to those of Table 6 but contained no inorganic cations. This mixture did not crystallise after 243 hours, but when potassium hydroxide equivalent to 5K$_2$O was added to the reaction mixture held at 180° C. a mixture of Nu-10, ZSM-5 and cristobalite was formed within 15 hours. This is in marked contrast to Example A (Table 6) which gave a form of ZSM-5 from an identical composition. One reason may be that X-ray amorphous seed nuclei formed in the alkali free reaction mixture but could not grow because of lack of hydroxide ions to depolymerise the aluminosilicate solids.

Examples 21 and 22 are analogous to Example 19 which gave Nu-10 together with a trace of cristobalite. Example 21 shows that some Nu-10 can be produced even if the organic component is omitted.

Example 23 gave a very crystalline form of Nu-10 and there is little doubt that the combination of sodium and rubidium ions is particularly suitable for crystallisation of Nu-10.

Examples 26 and 27 represent two attempts to prepare Nu-10 from an aluminium-free reaction mixture at 180° C. and 150° C. respectively. Both reactions gave ZSM-48 but Nu-10 was also formed at the lower temperature.

We claim:

1. In a method for the preparation of zeolite Nu-10 having the molar composition expressed by the formula: 0.5 to 1.5R$_2$O:Y$_2$O$_3$:at least 20XO$_2$:0 to 4.000H$_2$O wherein R is a monovalent cation or 1/n of a cation of valency n, X is silicon and/or germanium, Y is one or more of aluminum, iron, chromium, vanadium, molybdenum, arsenic, antimony, manganese, gallium or boron, and H$_2$O is water of hydration additional to water notionally present when R is H, said zeolite having the X-ray pattern as set out in Table 1 in the specification, said method comprising reacting an aqueous mixture containing sources of at least one oxide XO$_2$ and at least one oxide Y$_2$O$_3$;

the improvement wherein said mixture is free of organic compounds, the reaction mixture has the molar composition;
XO$_2$/Y$_2$O$_3$=10 to 1500
M$^1$OH/XO$_2$=10$^{-8}$ to 1.0
H$_2$O/XO$_2$=10 to 200
M$^2$Z/XO$_2$=0 to 4.0
wherein each M$^1$ and M$^2$ represents an alkali metal selected from the group consisting of sodium, potassium, rubidium and caesium, ammonium or hydrogen, X and Y have the meanings given above, Z represents an acid radical, the reaction is carried out at 130° to 220° C. and the composition of the reaction mixture and the reaction conditions are selected to produce said Nu-10.

2. A method as claimed in claim 1 in which the reaction mixture has the molar composition:

$XO_2/Y_2O_3 = 30$ to $1500$
$M^1OH/XO_2 = 10^{-6}$ to $0.25$
$H_2O/XO_2 = 15$ to $60$
$M^2Z/XO_2 = 0$ to $1.0$.

3. A method as set forth in claim 1 in which the reaction mixture contains a mixture of alkali metals selected from (a) rubidium and sodium and (b) rubidium and potassium.

4. A method as set forth in claim 1 wherein the oxide $XO_2$ is silica and the oxide $Y_2O_3$ is alumina.

* * * * *